United States Patent [19]
Evans

[11] Patent Number: 5,509,508
[45] Date of Patent: Apr. 23, 1996

[54] UNITARY CLIP AND SHIM DEVICE FOR BRAKE PAD OR THE LIKE

[75] Inventor: Michael D. Evans, Gates Mills, Ohio

[73] Assignee: Kateco, Inc., Cleveland, Ohio

[21] Appl. No.: 238,652

[22] Filed: May 5, 1994

[51] Int. Cl.⁶ .................................................. F16D 65/40
[52] U.S. Cl. .................................... 188/73.38; 188/73.31
[58] Field of Search ................................. 188/250 G, 242, 188/250 E, 73.31, 73.35, 73.36, 73.37, 73.38, 73.1, 264 G

[56] References Cited

U.S. PATENT DOCUMENTS

| 4,385,680 | 5/1983 | Ducharme | 188/72.4 |
|---|---|---|---|
| 4,537,289 | 8/1985 | VonGrunberg | 188/72 A |
| 4,609,077 | 9/1986 | Nakatsuhara | 788/73.38 |
| 4,611,693 | 9/1986 | Wang | 188/73.3 A |
| 4,809,825 | 3/1989 | Oltmanns | 188/73.38 |
| 4,823,920 | 4/1994 | Evans | 188/73.38 |

FOREIGN PATENT DOCUMENTS

| 3743291 | 6/1987 | Germany | 188/264 G |
|---|---|---|---|
| 622028A | 1/1987 | Japan | 188/264 G |
| 1031946 | 6/1986 | United Kingdom | 188/264 G |

OTHER PUBLICATIONS

Pp. 9 and 328 from 1990 Lee Brake Products Catalog.
Pp. 2–127 and 2–136 from 1980 Chilton Manual.
P. B914 from 1982 Motor Manual.
Pp. 322, 400 and 401 from Better Brake Parts Guide, date unknown.
Engineering Drawing dated May 13, 1983.
Engineering Drawing dated May 8, 1982.
Engineering Drawing dated Mar. 11, 1977.
Engineering Drawing dated Jun. 14, 1966.
Engineering Drawing dated Jan. 10, 1991.

Primary Examiner—David M. Mitchell
Assistant Examiner—C. T. Bartz
Attorney, Agent, or Firm—Renner, Kenner, Greive, Bobak, Taylor & Weber

[57] ABSTRACT

A device (10) is provided for a disc brake pad (11) having a backing plate (20) and actuated by a hydraulic piston (34). The retainer (10) includes tab members (14) for frictionally engaging the backing plate (20). Clip arms (16) are also provided for engaging the piston (34), and a shim (12) is provided to insulate the piston (34) from the backing plate (20). The tab members (14), clip arms (16) and shim (12) are integrated into a one-piece unit.

12 Claims, 2 Drawing Sheets

UNITARY CLIP AND SHIM DEVICE FOR BRAKE PAD OR THE LIKE

TECHNICAL FIELD

This invention relates to anti-rattle clips and noise reducing shims for use in conjunction with automobile disc brake pads. More particularly, this invention relates to a combined anti-rattle retaining clip and noise reducing shim to form a one piece disc brake pad device which eliminates high frequency brake pad noise.

BACKGROUND ART

For many years disc braking systems have been employed in a variety of automotive vehicles. Over the years a number of improvements have been made in these systems such as the utilization of composite friction materials, computer controlled hydraulic actuating systems, and the like. Despite the host of improvements made in disc braking systems, inherent problems associated therewith still exist. One such problem has been the high frequency noise which is produced, in part, by movement between the brake pad and the hydraulic actuating piston, and, in part, by rattling of the brake pad within the caliper housing while the vehicle is in motion and the brake system is at rest. Present attempts at solving the noise problem have been unsatisfactory because they involve a number of parts which are difficult to install and which increase the costs to manufacture and maintain the disc brake systems, without effectively eliminating noise.

Common attempts to reduce noise due to rattling of the pad within the caliper housing involve the use of anti-rattle clips or shoe support springs which are typically clipped, staked or riveted to the pad backing plate. These clips frictionally engage the interior wall of the piston in an attempt to stabilize movement of the pad when the brakes are at rest and the vehicle is in motion. The primary drawbacks to such efforts are that assembly is difficult and success in reducing noise depends heavily on proper installation, including positive contact between the clip and the piston. Further, present clips typically only contact the piston at a single point, thereby allowing some movement of the pad relative to the piston.

Common attempts at reducing noise due to movement of the pad relative to the piston when the braking system is applied typically involve the use of a gasket or shim interposed between the pad backing plate and the piston. This shim is intended to act as an insulator between the pad and piston, thereby interrupting and dampening any vibration between the two components. The primary drawback of such attempts is that the shim must be applied to the pad in a separate manufacturing step, such as by use of a suitable adhesive, thereby increasing manufacturing costs. If the shim is installed at the time the pads are installed on the vehicle, installation is further complicated and effective noise reduction, again, depends on proper installation.

Recently, automobile manufacturers along with brake system designers have sought to reduce the costs and space requirements of braking systems and to simplify installation and maintenance thereof without compromising quality or safety. The need persists, therefore, to reduce the number of components involved in brake systems, thereby reducing costs, inventory and space requirements. It is further desired to make installation and maintenance virtually "foolproof" so that positive, noise free operation may be safely and consistently accomplished.

DISCLOSURE OF THE INVENTION

It is thus an object of the present invention to provide a unitary shim/clip device which is effective to reduce or eliminate noise due to rattling of the pad within the caliper housing.

It is another object of the present invention to provide a device, as above, which is also effective to reduce or eliminate noise due to movement of the pad relative to the piston when the brake is applied.

It is a further object of the present invention to provide a device, as above, which is formed by a reduced number of components, thereby reducing the space required by the system.

It is yet another object of the present invention to provide a device, as above, which allows a reduced number of manufacturing steps as well as manufacturer inventory, thereby reducing costs.

It is a still further object of the present invention to provide a device, as above, which is simple to install and easy to maintain, while providing consistently safe, trouble free operation.

These and other objects of the present invention, which will become apparent from the description to follow, are accomplished by the improvements hereinafter described and claimed.

In general, a device made according to the present invention is designed to be used with a disc brake pad having a backing plate and being actuated by a hydraulic piston. The device includes a clip to engage the hydraulic piston, and a shim to insulate the piston from the backing plate. The clip and shim are integrated into a one-piece unit.

A preferred exemplary device incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
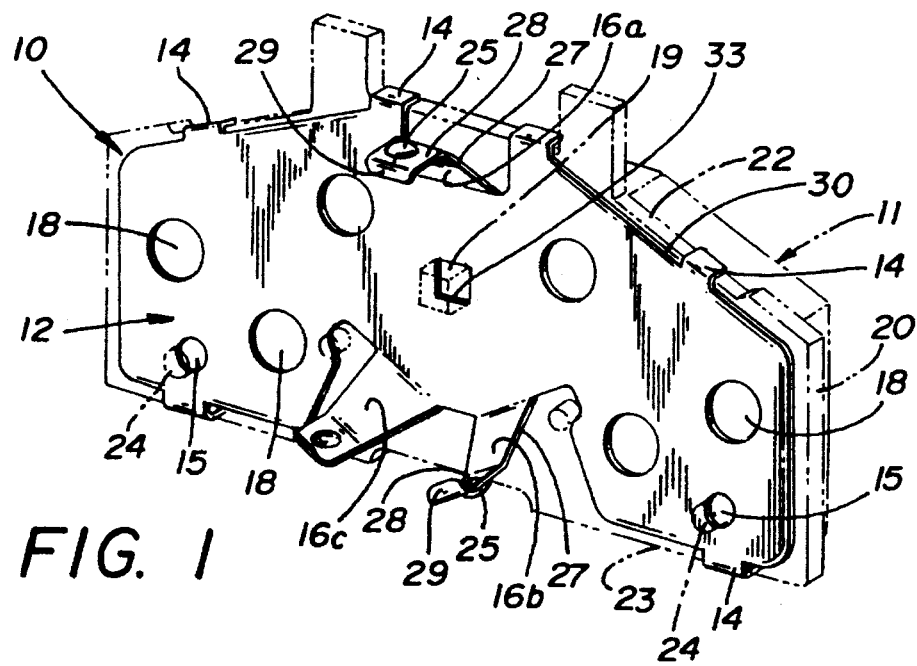
FIG. 1 is a perspective view of a disc brake pad incorporating the unitary shim/clip device according to the concept of the present invention.

A representative unitary shim/clip retainer device is generally indicated by the numeral 10 in the accompanying drawings and is designed to be used in conjunction with a conventional disc brake pad, indicated generally by the numeral 11. With reference to FIG. 1, it can be seen that device 10 has an overall shape which approximates that of the particular pad 11. It is contemplated that device 10 may be used with any of the disc brake pads used by both domestic and foreign automobile manufacturers. As such, it should be apparent that the overall shape of device 10 will depend on the particular shape of the pad with which it is to be used. For purposes of illustration, a generally rectangular shaped device is shown in the drawings.

Shim/clip device 10 is preferably fabricated from an appropriate tempered spring steel which may be stamped or pressed, and can be very thin, preferably having a thickness of approximately 0.033 inches. Those skilled in the art will appreciate that one of any number of materials and thicknesses may be used without departing from the spirit of the invention. Device 10 generally includes a main body portion 12, a plurality of pad engaging tabs 14, a plurality of locator apertures 15, and a plurality of piston engaging arms 16. Device 10 may further include a plurality of rivet clearance apertures 18 and one or more stake apertures 19.

Pad engaging tabs 14 extend generally orthogonally from main body portion 12 and are spaced at appropriate intervals around the outer circumference thereof. Tabs 14 are bent such that they may grippingly engage the milled steel backing plate 20 of pad 11, by way of frictional interference. While it is preferred that main body portion 12 include at least four to six pad engaging tabs 14, those skilled in the art will recognize that a greater or lesser number of tabs 14 may be included without departing from the spirit of the invention, it only being critical to include a sufficient number of tabs 14 to provide a secure, stable attachment to backing plate 20. Thus, as shown in FIG. 1, the representative embodiment of device 10 includes four tabs 14 to engage the upper edge 22 of backing plate 20 and two tabs 14 to engage the lower edge 23 of plate 20. It has been found that this particular configuration provides sufficient positive engagement of shim/clip device 10 to pad 11.

Locator apertures 15 are designed to matingly receive corresponding locator pins 24 which extend from backing plate 20. Proper positioning of device 10 relative to pad 11 is facilitated by alignment of locator pins 24 with locator apertures 15.

As shown in FIG. 1, preferably three piston engaging arms 16 extend outwardly and generally obliquely from main body portion 12. Each arm 16 includes a first leg 27, a second leg 28, and a third leg 29. The first legs 27 are the longest and preferably extend outward from main body portion 12 at an angle of approximately 55°. Each second leg 28 is substantially shorter than each first leg 27 and preferably extends therefrom at an angle of approximately 35°, thereby being essentially perpendicular to main body portion 12. Each second leg 28 further includes a dimple 25 which protrudes upwardly therefrom. The third legs 29 are the shortest and preferably extend from the second legs 28 at an angle of approximately 35°.

Considering each arm 16 individually, one arm 16a is centered near the upper edge 30 of device 10 such that its third leg 29 is pointing generally downward. The second arm 16b and the third arm 16c are obverse to the first arm 16a and are located at the four o'clock and eight o'clock positions, respectively, of the common radius upon which all three arms, 16a, 16b and 16c lie.

The multiplicity of rivet clearance apertures 18 are provided to allow proper seating of device 10 against backing plate 20 when friction material 32 of pad 11 is attached to backing plate 20 usually by way of rivets. Device 10 may be manufactured such that rivet clearance apertures 18 correspond with the location of the rivets for the particular pad 11 with which it is to be used. Thus, the rivet heads may protrude through device 10 without interfering with the engagement of device 10 to pad 11.

While it is intended that device 10 be readily removable and thereby reused or replaced, it is contemplated that there may be applications in which it would be desirable to permanently affix device 10 to backing plate 20. It is for this purpose that stake aperture 19 is provided in main body portion 12 of device 10. In the representative embodiment shown in the drawings, only a single stake aperture 19 is indicated; however, multiple stake apertures may be provided. Those skilled in the art will recognize that the stake aperture 19 may receive a corresponding stake 33 which protrudes from backing plate 20. Similarly, a rivet or other appropriate fastener may be employed.

Figure 2:
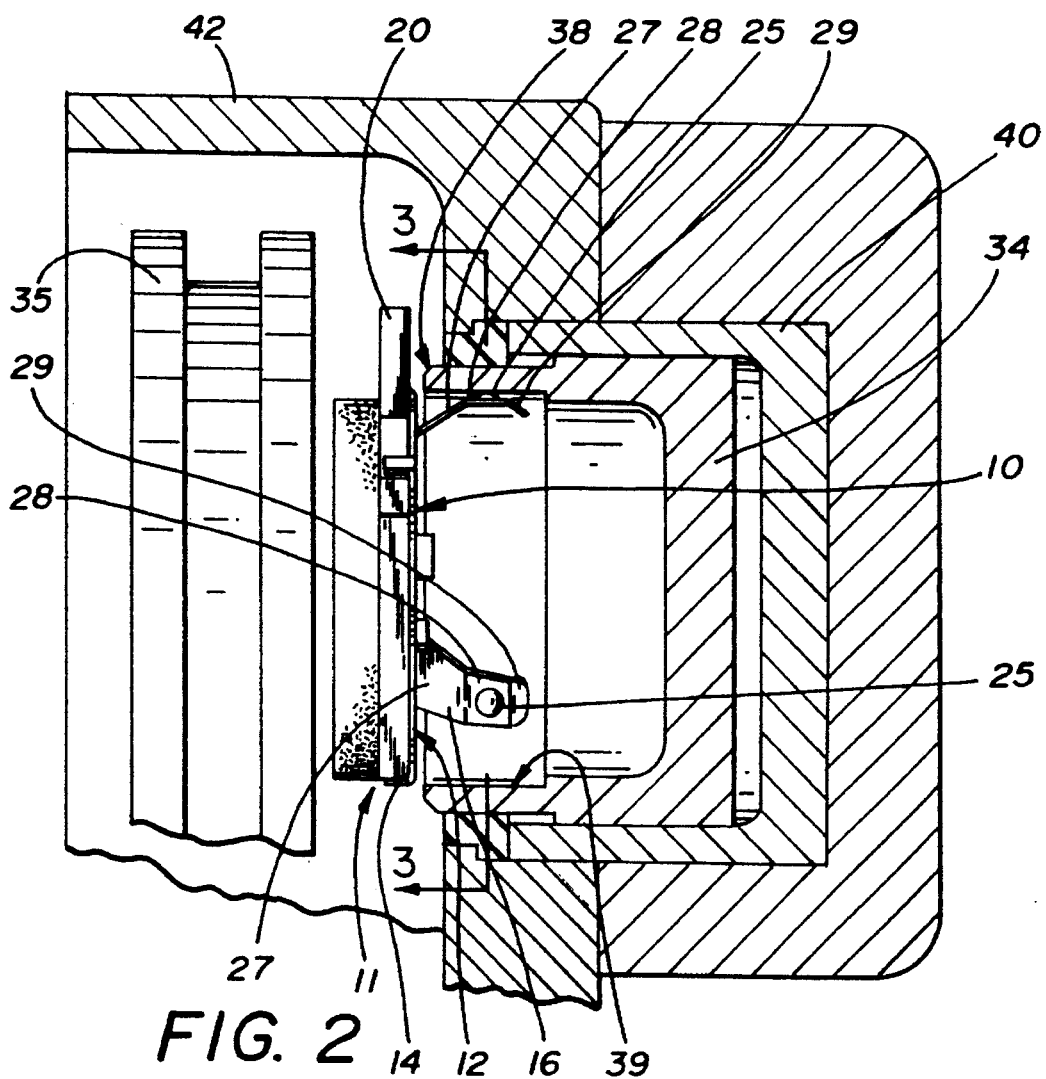
FIG. 2 is a partially sectioned view of a disc brake rotor and caliper assembly with the brake pad of FIG. 1 installed.
Figure 4:
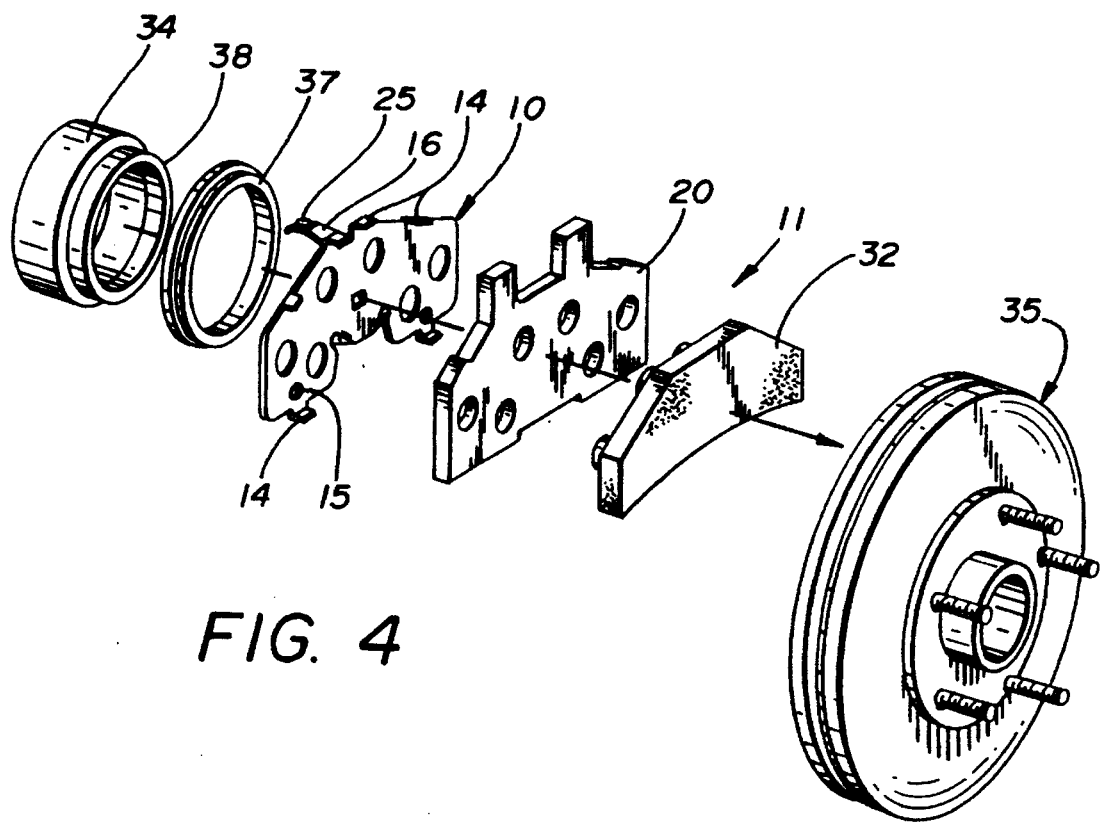
FIG. 4 is an exploded perspective view showing the location of the present invention relative to the piston and rotor.

With reference now to FIGS. 2 and 4, shim/clip device 10 according to the present invention is shown in conjunction with a hydraulic actuating piston 34, brake pad 11 and disc brake rotor 35. As indicated, a conventional asbestos or semi-metallic friction material 32 is attached to the backing plate 20 to form the brake pad 11. Friction material 32 is disposed adjacent to rotor 35 so that frictional engagement may be accomplished when the braking system is applied. Device 10 is attached to backing plate 20 opposite friction material 32, in the manner discussed previously. Typically, a rubber or thermoplastic boot 37 is installed on the engaging face 38 of piston 34. Piston engaging arms 16 of device 10 may then engage the inner bore 39 of the piston 34.

Figure 3:
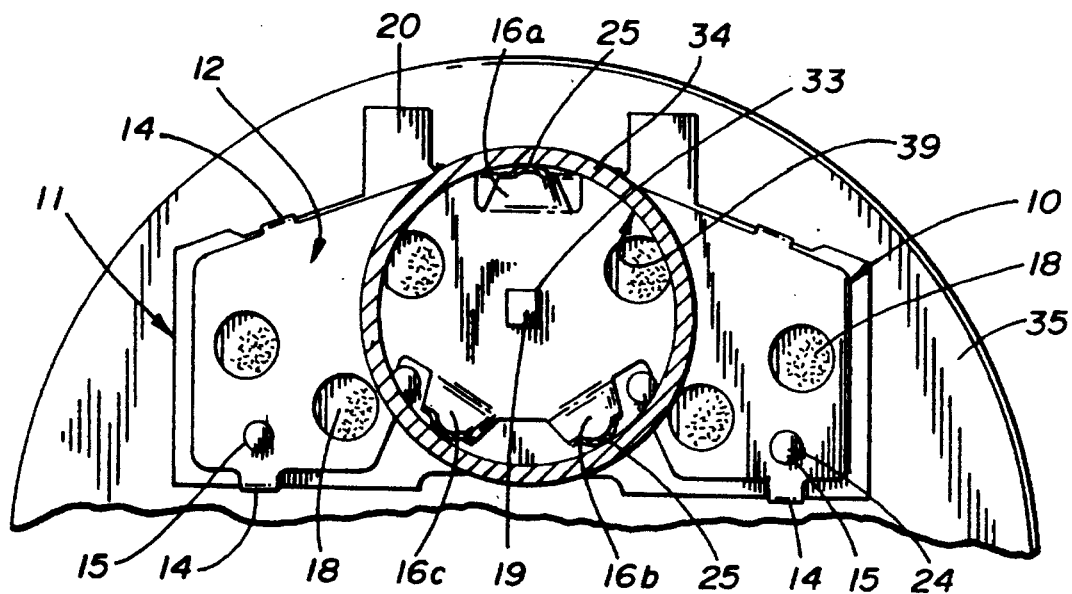
FIG. 3 is a sectional view taken substantially along the line 3—3 of FIG. 2.

As is most apparent in FIGS. 2 and 3, the second legs 28 of each piston engaging arm 16 lie on a radius which is larger than that of piston bore 39. As such, arms 16 must be slightly compressed to be received within piston bore 39. Compression is facilitated by the third legs 29 which, due to their inward angle, permit deflection of arms 16 when inserted in bore 39. The tendency of piston engaging arms 16 to flex outward provides a biasing pressure which ensures positive frictional engagement between arms 16 and bore 39. Each dimple 25 provides independent contact with piston bore 39 and further ensures such positive frictional engagement. With particular reference to FIG. 3, the three points of contact created by dimples 25 provide a triangular support for device 10 and hence, pad 11. This triangular support tends to be very stable and thereby prevents movement of device 10 and pad 11 relative to piston 34 when the braking system is at rest and the vehicle is in motion. Main body portion 12 further provides insulation between piston 34 and pad backing plate 20. Thus, main body portion 12 absorbs vibration and dampens relative motion between piston 34 and pad 11 when the braking system is applied and pad 11 contacts rotor 35.

As shown in FIG. 2, the piston cylinder 40 is integrated with the caliper housing 42. Those skilled in the art will, therefore, recognize that when device 10 is mounted to brake pad 11 and, in turn, to piston 34, movement of pad 11 relative to the caliper is stabilized, thereby preventing the common rattling that occurs when the brake system is at rest and the vehicle is in motion.

While the present invention has been shown for use with an inboard brake pad 11, it should be evident that the present invention may be adapted to be utilized with an outboard brake pad. Such adaptation would merely require a reconfiguration of the piston engaging arms 16 so that they may engage the particular caliper housing 42 in which the pad is mounted.

Not only is the present invention effective, therefore, to prevent or reduce the various forms of high frequency brake pad noise, but is also inexpensive to manufacture and easy to install and maintain. Thus, the above-described invention accomplishes the objects of the present invention and otherwise improves the art.

In the claims:

1. A device for use with a disc brake pad, the disc brake pad having a backing plate and being actuated by a hydraulic piston, the device comprising clip means for engaging said piston, shim means for insulating the backing plate from said piston, and at least one alignment pin extending from the backing plate, said shim means having a main body portion, at least one alignment aperture in said main body portion corresponding in position with said at least one alignment pin so that said at least one alignment pin may be received in said at least one alignment aperture, said clip means and said shim means being integrated as a one-piece unit.

2. A device according to claim 1 further comprising means for engaging the backing plate, said means for engaging being integral with said shim means.

3. A device according to claim 2 wherein said means for engaging the backing plate includes a plurality of tab members extending from said shim means to frictionally engage the backing plate.

4. A device according to claim 1 wherein said clip means includes a plurality of piston engaging arms to frictionally engage the hydraulic piston.

5. A device according to claim 4 further comprising a dimple on each said arm to assist in the frictional engagement of the piston.

6. A device according to claim 4 wherein said piston engaging arms extend from said main body portion, said main body portion being interposed between the backing plate and the hydraulic piston.

7. A device according to claim 6 wherein said piston engaging arms each include a first leg which extends obliquely from said main body portion, a second leg extending obliquely from said first leg, said second leg having a dimple thereon, and a third leg extending obliquely from said second leg, said piston engaging arms forming an angular support for engaging the piston.

8. A device according to claim 4 wherein the hydraulic piston has a cylindrical internal bore forming an internal radius and said plurality of piston engaging arms of said clip means lie on a common radius, said common radius being larger than said internal radius of the hydraulic piston.

9. A device according to claim 1 wherein said shim means includes at least one rivet clearance aperture to allow said main body portion to seat firmly against the backing plate.

10. A device according to claim 1 further comprising means for permanently affixing said main body portion to the backing plate.

11. A device according to claim 10 wherein said means for permanently affixing includes one or more apertures in said main body portion which correspond in position with one or more fastening stakes protruding from the backing plate.

12. A device for use with a disc brake pad, the disc brake pad having a backing plate and being actuated by a hydraulic piston, the device comprising clip means for engaging the piston, shim means for insulating the backing plate from the piston, said clip means and said shim means being integrated as a one-piece unit and at least one fastening stake protruding from the backing plate, said shim means having a main body portion and at least one aperture in said main body portion which corresponds in position with said at least one fastening stake.

* * * * *